United States Patent [19]

Smith

[11] Patent Number: 4,640,040
[45] Date of Patent: Feb. 3, 1987

[54] CYCLIC FISHING LURE CONTAINING A SLIDABLE FISHHOOK ASSEMBLY

[75] Inventor: Dale C. Smith, Salt Lake City, Utah

[73] Assignee: Dolly Varden Fishing Lures, Salt Lake City, Utah

[21] Appl. No.: 817,994

[22] Filed: Jan. 13, 1986

[51] Int. Cl.⁴ .............................................. A01K 85/00
[52] U.S. Cl. ........................................ 43/42; 43/42.44
[58] Field of Search ................... 43/42, 1, 34, 17.2, 43/42.02, 42.03, 42.04, 42.31, 42.44, 42.45, 42.52, 42.72, 42.74, 42.84

[56] References Cited

U.S. PATENT DOCUMENTS

| | | | |
|---|---|---|---|
| 281,083 | 7/1883 | Kessler | 43/42.19 |
| 787,806 | 4/1905 | Torgerson | 43/42.74 |
| 982,974 | 1/1911 | Miller | 43/42.44 |
| 2,494,620 | 1/1950 | Johnson | 43/42.19 |
| 2,585,494 | 2/1952 | Pelto | 43/42.49 |
| 2,639,537 | 5/1953 | Wagner | 43/42.52 |
| 3,040,468 | 6/1962 | Knapton | 43/42.74 |
| 4,142,319 | 3/1979 | Mihalevic | 43/42.49 |

FOREIGN PATENT DOCUMENTS

| | | | |
|---|---|---|---|
| 2460108 | 2/1981 | France | 43/42.49 |
| 2083 | of 1901 | United Kingdom | 43/42.74 |

Primary Examiner—Nicholas P. Godici
Assistant Examiner—K. Rowan
Attorney, Agent, or Firm—Thorpe, North and Western

[57] ABSTRACT

A fishing lure having a cyclic structure consisting of a front towbar portion containing means for attachment to a fishing line and a rear track portion integral with an interconnecting opposing ends of said towbar. Ring means encircle said track portion and are slidable thereon. A hooking mechanism is attached to said slidable thereon. A hooking mechanism is attached to said slidable ring means. As the lure is towed through the water, changes in force, caused by water currents or change in direction of the tow, causes the ring means to slide along the track thereby changing the position of the hooking mechanism on the lure.

10 Claims, 7 Drawing Figures

CYCLIC FISHING LURE CONTAINING A SLIDABLE FISHHOOK ASSEMBLY

BACKGROUND OF THE INVENTION

This invention relates to a fishing lure wherein the hooking mechanism is mobile about a sliding track. More specifically, this invention relates to a fishing lure wherein the hooking mechanism is allowed to change positions on the lure in response to changing forces in the water.

Most fishing lures in the form of jigs, flies, spinners, spoons, flatfish and the like have a specific position on them to which the hooking mechanism is attached. The hook may be attached via a swivel so that it may rotate, be responsive to the tow of the line, water currents and the like and not become tangled.

In the above mentioned lures the hook is relatively stationary in regards to its point of attachment to the lure. While this is satisfactory in most instances there are other arrangements which may also be useful. Fishing enthusiasts are interested in better and novel lures which might attract that heretofore elusive fish and also for lures that provide new and exciting means in the art of fishing.

OBJECTS AND SUMMARY OF THE INVENTION

It is an object of the present invention to provide a lure wherein the hooking mechanism is capable of movement relative to the lure body by means of a track.

It is also an object of the present invention to provide a lure wherein the hook is capable of manipulation about the lure body such that the location of the hook relative to the lure may change depending upon the various forces being exerted upon the lure when being pulled through a body of water.

These and other objects may be accomplished by means of a cyclic lure consisting of a front towbar which contains line attachment means. Intergral with and depending backwardly and inwardly from opposing ends of the towbar is a track to which a hooking mechanism may be slidably attached. A generally circular ring having a diameter greater than the diameter of the track encircles the track and provides means to which a hooking mechanism may be attached. The ring is slidable around the perimeter of the track allowing the hooking mechanism to be positioned anywhere along the track in response to the forces placed upon the lure assembly when being towed or dragged through the water.

DETAILED DESCRIPTION OF THE INVENTION

Figure 1:
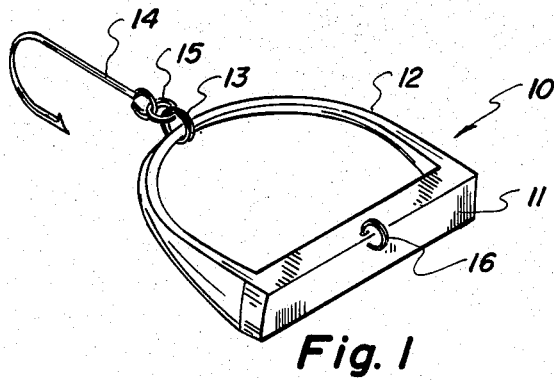
FIG. 1 is a perspective view of one embodiment of the invention showing a lure consisting of a front towbar, track, ring and hooking mechanism.
Figure 2:
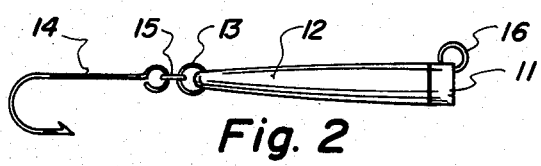
FIG. 2 is side view of the lure shown in FIG. 1.
Figure 3:
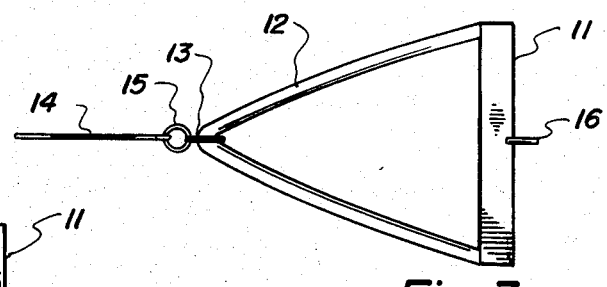
FIG. 3 is a top view of the lure shown in FIG. 1.

A complete embodiment of the invention is shown in FIGS. 1, 2 and 3.

The complete lure 10 consists of a towbar 11, a track 12, a ring 13 encircling the track and slidable thereabout and a hooking mechanism 14 preferable attached to the ring 13 by a smaller ring or swivel 15. An eye 16 or similar means is attached to towbar 11 for attachment to a fishing line or leader.

The towbar 11 may be of any desirable shape provided that it is constructed such that, at its juncture with track 12, ring 13 will not pass from track 12 onto towbar 11. This may be accomplished in various ways.

As shown in FIGS. 1-3, the track 12 is tapered in diameter from the juncture with towbar 11 to its back end. In other words, the diameter of track 12 is greatest where it is joined to towbar 11 and gradually decreases in diameter as it curves backwardly and inwardly. The diameter of ring 13 accomodates the varying diameters of track 12 but is too small to pass over and onto towbar 11.

Generally, it is preferably to make towbar 11 sufficiently large that the ring 13 cannot encircle it. However, other means such as a stop pin protruding upwardly and downwardly at the juncture of the towbar 11 with track 12 could also be used to prevent ring 13 from slipping over on to the towbar.

The towbar 11 may be of any desired shaped. It is shown to be flat in FIGS. 1-3 but could contain decorative design elements attached to it such as a fish, twig, moss, salmon eggs or any other item that might be used as bait or found under the water surface. In the alternative, the towbar could contain a fanciful decorative design such as a mermaid. One design found particularly useful on a towbar consists of human female breasts in any desired color or combination of colors.

An eyelet 16 is contained in the towbar 11 in a generally centered position relative to the ends thereof to which the track 12 is joined. Preferably eyelet 16 will be in the upper portion of the towbar surface. A fishing line or leader is attached to the eyelet 16 directly or through a swivel or snap connector.

As shown in FIGS. 1-3 the track 12 angles backwardly and inwardly in a form of a curved "V". In this configuration the ring 13 and hooking mechanism 14 will generally stay at the end of the "V" when being towed through the water. However, if water currents or the angle of tow change and cause the lure to wobble or change positions the split ring 13 will be free to slide along the track 12 and change the position of hook 14. The hook 14 will preferably contain some form of bait such as cheese, salmon eggs, night crawlers, earthworms, bacon and the like. Also, minnows or other forms of live bait can be used as bait if desired. In this regard, hooking mechanism 14 can be any type conventionally used, i.e. single hook, treble hook, cheese hook and the like. Two or more rings 13 and hooking mechanisms 14 may be utilized on track 12 at the same time.

Ring 13 may be any suitable ring which can fit about and slide along track 12. Closely coiled spring tensioned split rings commonly used as key rings are particularly well adapted for use and come in a variety of sizes. These split rings, appropriately sized, are also suitable as connectors 15 for use in connecting a hook 14 to ring 13. Such split rings have ends which can be spread under tension. One spread end is placed about the track or about another ring and the split ring is then rotated about the track or other ring until the entire length of the coil has passed about the track or other ring and encircles it. However, pertaining to ring 15, a conventional fishing swivel may also be used.

Figure 4:
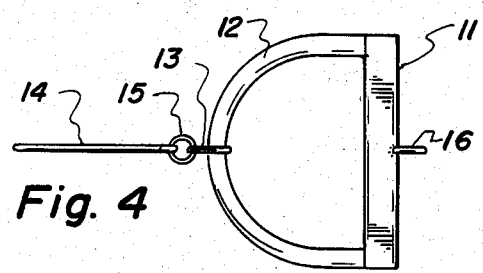
FIG. 4 is a top view of a second embodiment wherein the track is more uniformly curved than in FIG. 1.

A variation of track configuration is shown in FIG. 4 wherein all parts of the lure are numbered the same as in FIGS. 1-3. The track 12 is shown to be curved in a "U" shape instead of the "V" shown in FIG. 1. This allows the ring 13 and hook 14 to slide more easily in response to changes in water current or direction of tow.

Figure 5:
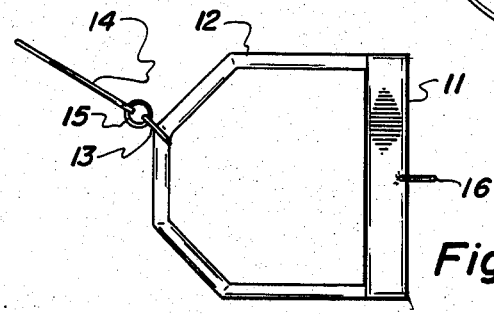
FIG. 5 is a top view of a third embodiment wherein the track is made of distinct angles.

A third embodiment is shown in FIG. 5 wherein the track 12 consists of a series of angles forming a polygon. Such an arrangement encourages the ring 13 to be positioned at one of the angles as the lure is towed through the water. Thus, the movement of the ring 13 and hook 14 may not be continuous as they slide along track 12 but will be a halting or intermittent movement which may be more attractive to a fish.

Figure 7:
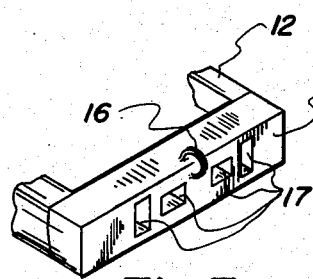
FIG. 7 is a partial perspective view of a lure as in FIG. 1 showing an apertured towbar.
Figure 6:
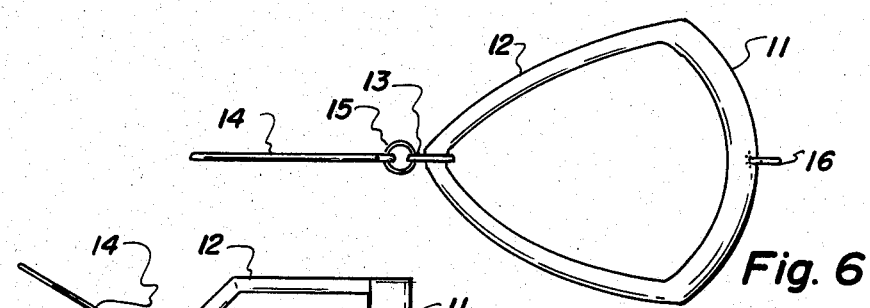
FIG. 6 is a top view of a fourth embodiment wherein the towbar is also curved.

Still another embodiment is shown in FIG. 6 wherein the towbar 11 is curved and the track 12 assumes the "V" shaped configuration of FIG. 1. Finally, FIG. 7 shows a fragmentary view of a towbar 11 and portion of a track 12 wherein the towbar 11 contains apertures 17 extending through the width thereof from the front or outer surface to the back or inner surface which allows the water to flow through the towbar as it is pulled through the water. Apertures 17 may be of any suitable shape and may directly penetrate the towbar or may be angled in the form of vanes to direct water passing through in different directions. This allows currents of water to affect the positioning of the ring 13 and hook 14 on track 12. Apertures 17 also affect the manner in which the lure 10 moves when being towed through the water.

The manner of using the lure 10 as thus described will be obvious to those skilled in the art of fishing. The lure may be constructed of wood, metal, ceramics, plastics or any other suitable materials of varying weights and be made in various sizes and colors. The lure may be utilized in various ways such as by casting or trolling.

The above description, while showing the preferred embodiments is illustrative only. It will be obvious to those skilled in the art that various configurations in the towbar and track may be utilized without departing from the scope of the invention. Therefore, the invention is deemed to include all functional equivalents and is limited in scope only by the following claims.

I claim:

1. A cyclic fishing lure having a slidable hooking mechanism consisting of a front towbar having opposing ends, said towbar containing means centrally located relative to said opposing ends for attachment to a fishing line, said towbar being integral with a continuous track interconnecting the opposing ends of said towbar, said track depending backwardly and inwardly from said towbar thereby forming a rigid, uninterrputed cyclic structure, ring means encircling said track and slidable thereon and hooking means attached to said ring means.

2. A cyclic fishing lure as in claim 1 wherein said towbar has dimensions such that said ring means encircling said track will not slide along said towbar.

3. A cyclic fishing lure as in claim 2 wherein said rack depends backwardly and inwardly from said towbar in a generally "V" shape.

4. A cyclic fishing lure as in claim 2 wherein said track depends backwardly and inwardly from said towbar in a generally "U" shape.

5. A cyclic fishing lure as in claim 2 wherein said track depends backwardly and inwardly from said towbar in a series of angles.

6. A cyclic fishing lure as in claim 2 wherein said track has a tapered diameter which is greatest at the juncture of said track with said towbar and decreases as it depends backwardly and inwardly.

7. A cyclic fishing lure as in claim 2 wherein towbar is generally flat in shape.

8. A cyclic fishing lure as in claim 7 wherein said towbar contains a decorative design on the front portion thereof.

9. A cyclic fishing lure as in claim 2 wherein said towbar is curved.

10. A cyclic fishing lure as in claim 2 wherein said towbar has a series of apertures extending through the width thereof from the front surface to the back surface.

* * * * *